US012707326B2

(12) United States Patent
Erta et al.

(10) Patent No.: US 12,707,326 B2
(45) Date of Patent: Aug. 11, 2026

(54) MULTICAST FLOW OPTIMIZATIONS IN A MULTI-LEVEL BACKHAUL MESH OF A WIRELESS NETWORK

(71) Applicant: Cisco Technology, Inc., San Jose, CA (US)

(72) Inventors: Alessandro Erta, Licciana Nardi (IT); Loris Gazzarrini, Lausanne (CH); Salvatore Valenza, Pomy (CH); Pascal Thubert, Roquefort les Pins (FR); Luca Bisti, Grosseto (IT); Domenico Ficara, Essertines-sur-Yverdon (CH)

(73) Assignee: Cisco Technology, Inc., San Jose, CA (US)

( * ) Notice: Subject to any disclaimer, the term of this patent is extended or adjusted under 35 U.S.C. 154(b) by 370 days.

(21) Appl. No.: 18/133,348

(22) Filed: Apr. 11, 2023

(65) Prior Publication Data

US 2024/0349116 A1 Oct. 17, 2024

(51) Int. Cl.

| | |
|---|---|
| ***H04W 28/06*** | (2009.01) |
| ***H04W 4/06*** | (2009.01) |
| ***H04W 40/02*** | (2009.01) |
| ***H04W 60/00*** | (2009.01) |
| *H04L 12/18* | (2006.01) |

(52) U.S. Cl.

CPC ............. *H04W 28/06* (2013.01); *H04W 4/06* (2013.01); *H04W 40/023* (2013.01); *H04W 60/00* (2013.01); *H04L 12/189* (2013.01)

(58) Field of Classification Search

CPC ..... H04W 28/06; H04W 4/06; H04W 40/023; H04W 60/00; H04L 12/189

See application file for complete search history.

(56) References Cited

U.S. PATENT DOCUMENTS

| | | | | |
|---|---|---|---|---|
| 7,606,187 | B2 | 10/2009 | Zeng et al. | |
| 8,848,608 | B1 * | 9/2014 | Addepalli | H04L 43/0858 370/401 |
| 9,014,051 | B2 | 4/2015 | Mylarappa et al. | |
| 9,325,513 | B2 | 4/2016 | Liu et al. | |
| 9,832,242 | B2 | 11/2017 | Hui et al. | |
| 10,230,620 | B2 | 3/2019 | Kalkunte | |
| 10,735,924 | B2 | 8/2020 | Thubert et al. | |
| 2014/0062790 | A1 * | 3/2014 | Letz | G08G 1/012 342/386 |
| 2016/0219414 | A1 * | 7/2016 | Purohit | H04W 4/06 |
| 2019/0306677 | A1 * | 10/2019 | Basu | G08G 1/0112 |

(Continued)

OTHER PUBLICATIONS

Thubert, et al., "IPv6 Options for DetNet", DetNet Working Group, Aug. 2021, 16 pages, IETF Trust.

(Continued)

*Primary Examiner* — Mandish K Randhawa

(74) *Attorney, Agent, or Firm* — Lee & Hayes, P.C.

(57) ABSTRACT

In one embodiment, an intermediate device in a backhaul mesh for a wireless network receives a registration from an access point of the wireless network in communication with a mobile system. The intermediate device receives a packet that is multicast by a gateway into the backhaul mesh and destined for the mobile system. The intermediate device makes, based on the registration, a determination that the packet should be sent to the access point. The intermediate device sends the packet to the access point for transmittal to the mobile system.

20 Claims, 12 Drawing Sheets

(56) References Cited

U.S. PATENT DOCUMENTS

| | | | | |
|---|---|---|---|---|
| 2022/0046391 | A1* | 2/2022 | Ong | H04W 4/08 |
| 2023/0422025 | A1* | 12/2023 | Ohnuma | H04W 8/26 |

OTHER PUBLICATIONS

Thubert, Pascal, "IPv6 Neighbor Discovery Multicast Address Registration", 6lo Working Group, Oct. 2021, 15 pages, IETF Trust.

* cited by examiner

MULTICAST FLOW OPTIMIZATIONS IN A MULTI-LEVEL BACKHAUL MESH OF A WIRELESS NETWORK

TECHNICAL FIELD

The present disclosure relates generally to computer networks, and, more particularly, to multicast flow optimizations in a multi-level backhaul mesh of a wireless network.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication. Accordingly, wireless mesh networks are now being deployed, to provide connectivity to such fast-moving mobile systems.

While mesh networks can be quite capable of ensuring connectivity with fast-moving vehicles and other mobile systems, the reliability of these communications is also a function of the number of networking nodes in the mesh of the backhaul network. Indeed, networking nodes in the mesh must be located at physical locations that ensure both reliable connectivity with any mobile system, as well as between any access points and the gateway of the backhaul network. Consequently, the mesh network may include a relatively large number of networking nodes across a deployment.

With the relatively large number of nodes in the backhaul mesh network, establishing and maintaining state in a multicast tree is slow, since addresses need to percolate all the way up to the top of the mesh. In scenarios with fast-moving mobile systems, this results in a window of time during which communications may become lost. Of course, flooding the multicast packet into the entire tree of the backhaul network is one possible strategy to mitigate against this loss, but doing so also would also be highly wasteful in terms of bandwidth.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
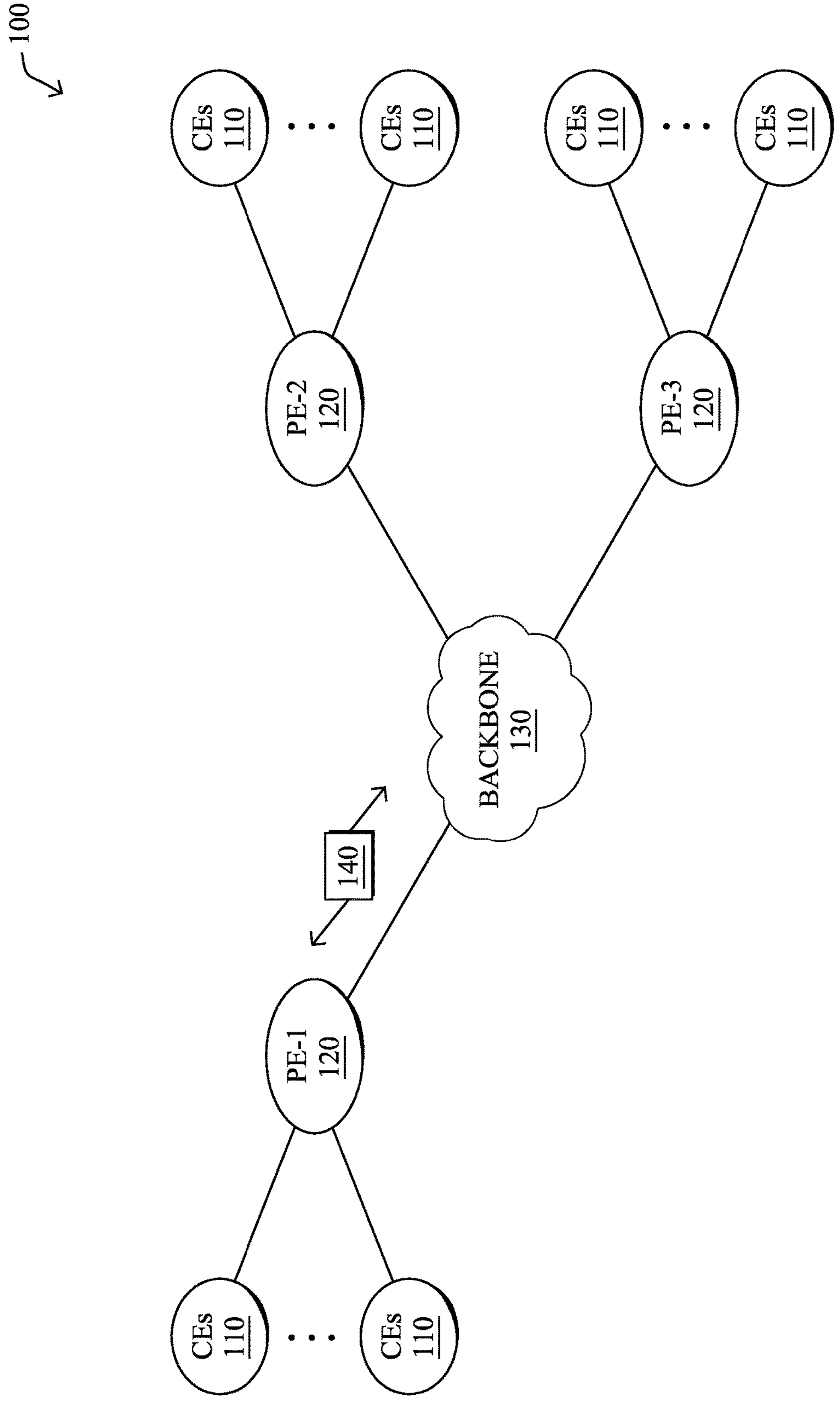
FIGS. 1A-1B illustrate an example communication network.

According to one or more embodiments of the disclosure, an intermediate device in a backhaul mesh for a wireless network receives a registration from an access point of the wireless network in communication with a mobile system. The intermediate device receives a packet that is multicast by a gateway into the backhaul mesh and destined for the mobile system. The intermediate device makes, based on the registration, a determination that the packet should be sent to the access point. The intermediate device sends the packet to the access point for transmittal to the mobile system.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
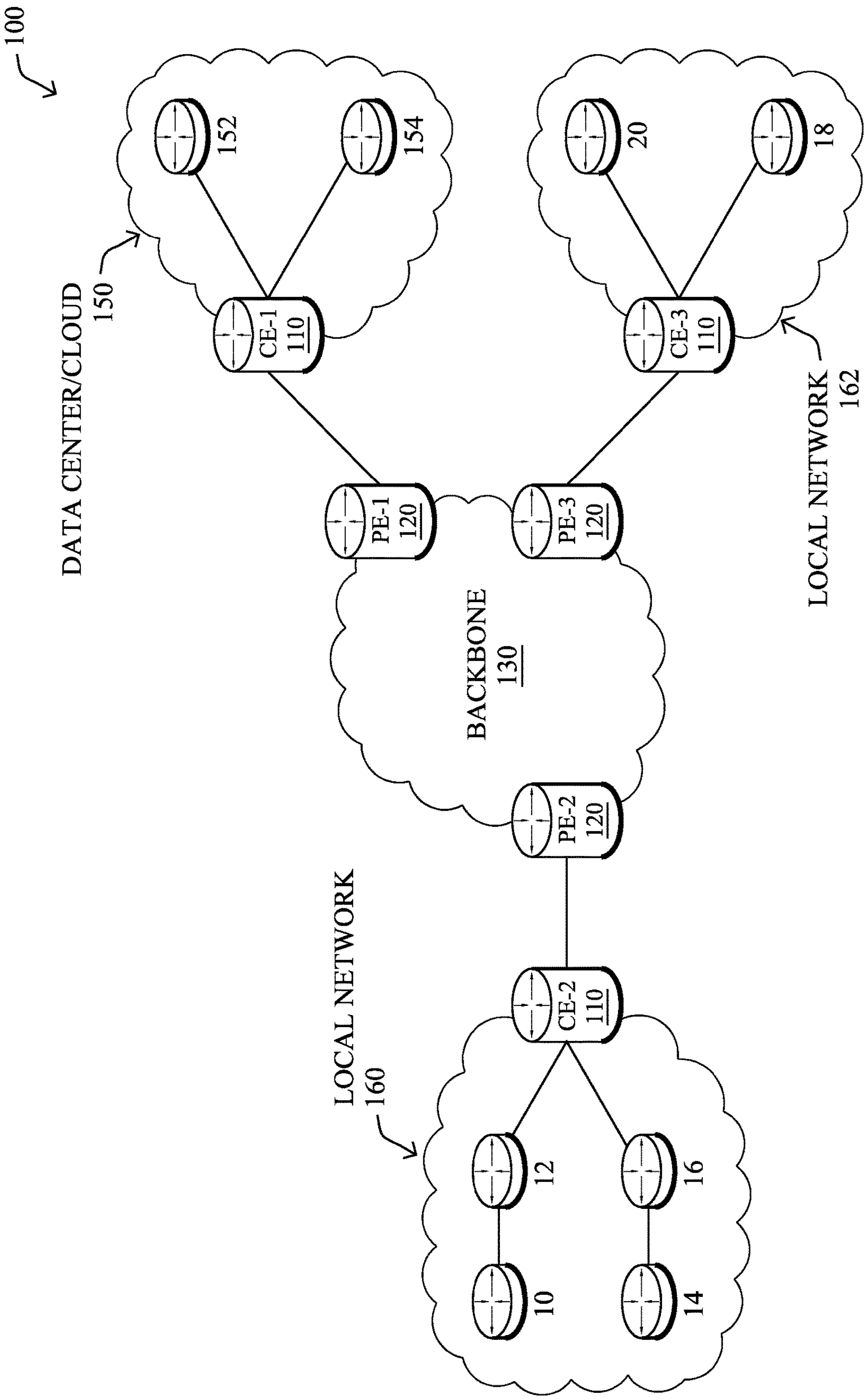

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
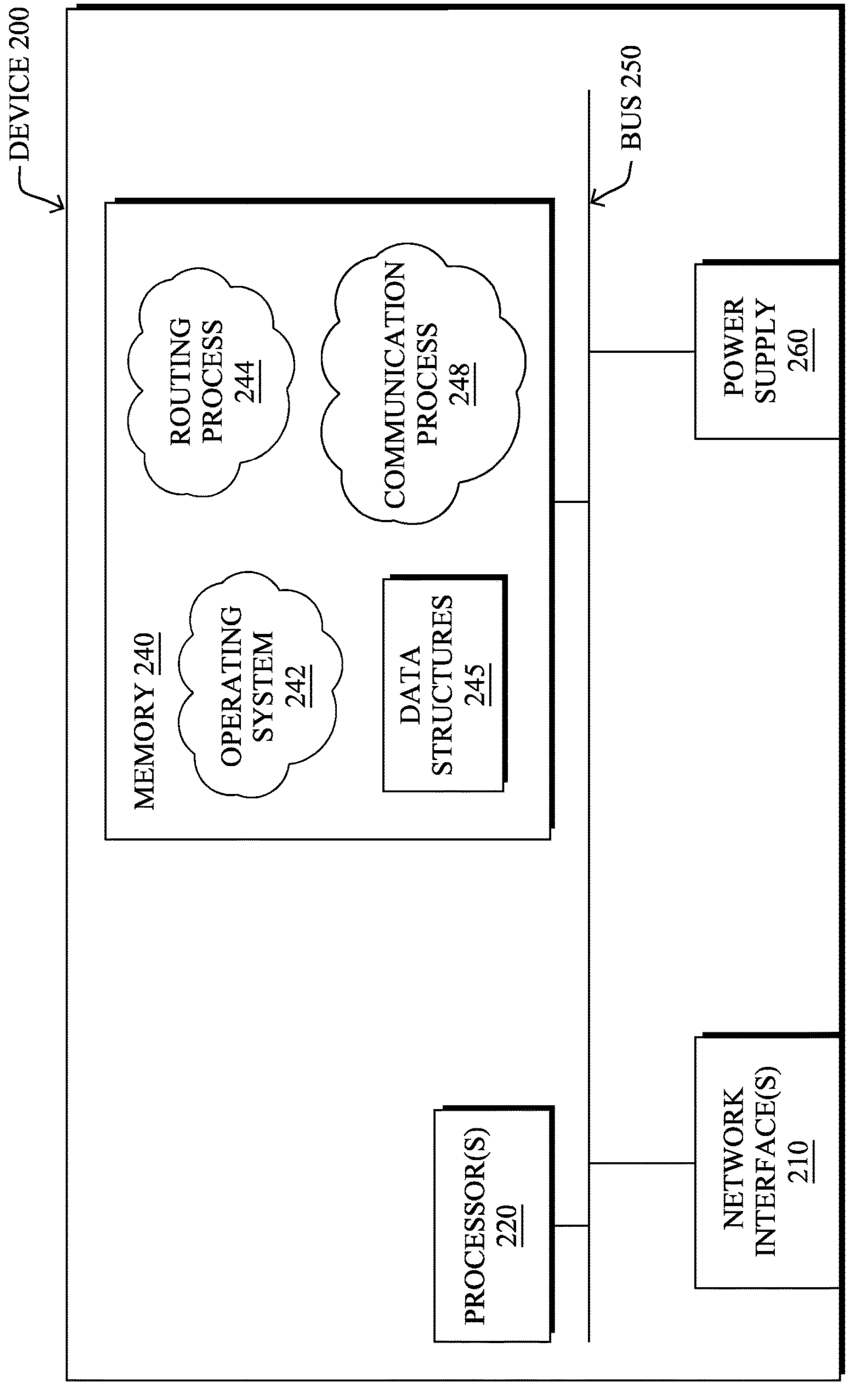
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected/coupled by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE). Another protocol that communication process 248 may utilize is the Control and Provisioning of Wireless Access Points (CAPWAP) protocol.

Figure 3:
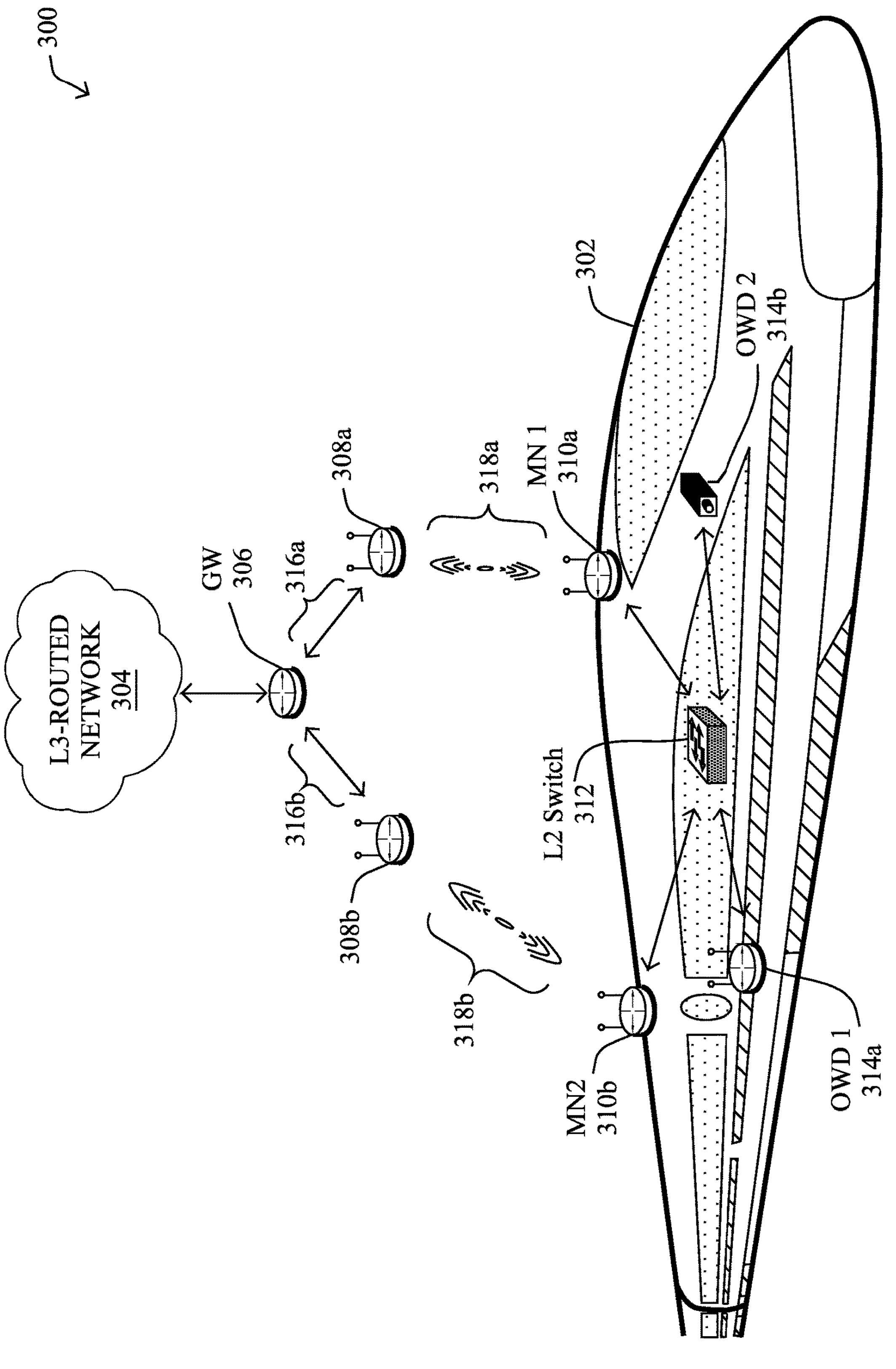
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314*a* may take the form of an onboard Wi-Fi access point that provides connectivity to any number of user devices (e.g., mobile phones, computers, etc.) of passengers being transported by mobile system 302. Conversely, onboard device 314*b* may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first mobile node 310*a* and a second mobile node 310*b*. Each mobile node 310 may generally include: 1.) a wireless interface to exchange data with wireless access points of the backhaul network and 2.) a local interface to exchange data with the local network of mobile system 302. For instance, mobile node 310*a* and mobile node 310*b* may each have a wired connection to L2 switch 312.

As would be appreciated, mobile node 310*a* and mobile node 310*b* may be located on mobile system 302 at a distance from one another, so as to provide spatial diversity to the potential wireless connection points utilized by mobile system 302. For example, mobile node 310*a* may be located near the front of mobile system 302 (e.g., the head-end of a train), while mobile node 310*b* may be located farther towards the rear of mobile system 302 than that of mobile node 310*a*. Thus, even if a particular mobile node 310 does not have a reliable wireless connection to the backhaul system, another mobile node 310 of mobile system 302 may (e.g., if the train is going around a curve in the track, etc.). In some instances, mobile nodes 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless base stations/access points 308. For instance, as shown, there may be trackside access points 308*a*-308*b* shown. Note that while these wireless access points are referred to herein as 'trackside,' their locations can be varied depending on the deployment scenario (e.g., roadside, etc.).

During operation, access points 308*a*-308*b* may form wireless connections with mobile node 310*a* and/or mobile node 310*b*, to provide wireless connectivity to mobile system 302 as it travels. To this end, each access point 308 may include at least 1.) a wireless interface to communicate with a mobile node 310 and 2.) an interface to communicate with a gateway 306, denoted "GW" for simplicity. Typically, the connections between access points 308*a*-308*b* and gateway 306 are wired connections that use a suitable wired communication protocol, such as Ethernet.

Gateway 306 represents the other end of the backhauling system and provides Layer-3 (L3) routing functions. To do so, gateway 306 may include at least one interface connected to L3-routed network 304, as well as any number of interfaces to communicate with access points 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that mobile node 310*a* has formed a wireless connection 318*a* with access point 308*a*. Such a connection may be formed using a suitable transmission protocol, such as the Prodigy protocol by Fluidmesh (now Cisco Systems) or another wireless protocol that supports extremely fast handoffs. Consequently, mobile node 310*a* may establish a first tunnel over wireless connection 318*a*. gateway 306 and access point 308*a* may form a second tunnel via their connection 316*a*, likewise. Thus, when access point 308*a* sends traffic that it receives from mobile node 310*a* towards gateway 306, it may encapsulate the traffic and tunneled via the first tunnel, which access point 308*a* then encapsulates for transport via the second tunnel to gateway 306. A similar approach may be taken with respect to wireless connection 318*b* between mobile node 310*b* and access point 308*b*, as well as connection 316*b* between access point 308*b* and gateway 306.

In alternative embodiments, a single L2 tunnel may be established between each access point 308 and gateway 306. This tunnel will carry L2 traffic between gateway 306 and the mobile node 310 to which the access point 308 is connected. For instance, a first L2 tunnel may be formed between gateway 306 and access point 308*a* over which traffic conveyed between access point 308*a* and mobile node 310*a* may be transported, assuming that wireless connection 318*a* exists. Similarly, another gateway 306 and access point 308*b* may form a second L2 tunnel over which traffic conveyed between access point 308*b* and mobile node 310*b* may be transported, assuming that wireless connection 318*a* exists.

Typically, only a single wireless link is active at any given time between a mobile system, such as mobile system 302, and any given access point 308. For instance, assume that mobile node 310*a* is wirelessly connected to access point 308*a*. In such a case, any other mobile node 310 on mobile system 302 (e.g., mobile node 310*b*, etc.) may be in an idle state at that time. In other words, one of the mobile nodes (e.g., mobile node 310*a*) may be designated as the primary, while the other is designated as the secondary (e.g., mobile node 310*b*) and remains idle. As mobile system 302 roams, the primary node may begin passing its traffic to the secondary node, to begin leveraging its own connection to the fixed infrastructure. In turn, the roles of the two nodes may be switched, thereby making mobile node 310*a* the secondary node and mobile node 310*b* the primary node.

As noted above, backhaul connectivity in many wireless mesh networks in fixed deployments for fast-moving clients/nodes rely on some form of tunneling, such as through the use of MPLS, CAPWAP, EoGRE, or the like. In many of these cases, tunneling is hierarchical in that tunnels are carried within tunnels, in order to preserve segmentation across different domains and abstract network characteristics. To do so, a packet may be encapsulated any number of times with different tunnel headers, during its transit to its destination (e.g., the network gateway, etc.).

However, with the relatively large number of nodes in the backhaul mesh network, establishing and maintaining state in a multicast tree is slow, since addresses need to percolate all the way up to the top of the mesh. In scenarios with fast-moving mobile systems, this results in a window of time during which communications may become lost. Of course, flooding the multicast packet into the entire tree of the backhaul network is one possible strategy to mitigate against this loss, but doing so also would also be highly wasteful in terms of bandwidth.

Multicast Flow Optimizations in a Multi-Level Backhaul Mesh of a Wireless Network The techniques herein leverage a hybrid of ingress replication and packet pruning in a backhaul mesh network, to support fast-moving mobile systems that rely on the mesh for wireless connectivity. In some aspects, the techniques herein use a singular multicast tree for all of the multicast flows in the gateway domain. Packets are also flooded a few hops in the backhaul mesh and then forwarded or dropped/pruned, based on a multicast state that is only available at an intermediate level in the mesh.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein, potentially in conjunction with routing process 244.

Specifically, in various embodiments, an intermediate device in a backhaul mesh for a wireless network receives a registration from an access point of the wireless network in communication with a mobile system. The intermediate device receives a packet that is multicast by a gateway into the backhaul mesh and destined for the mobile system. The intermediate device makes, based on the registration, a determination that the packet should be sent to the access point. The intermediate device sends the packet to the access point for transmittal to the mobile system.

Figure 4A:
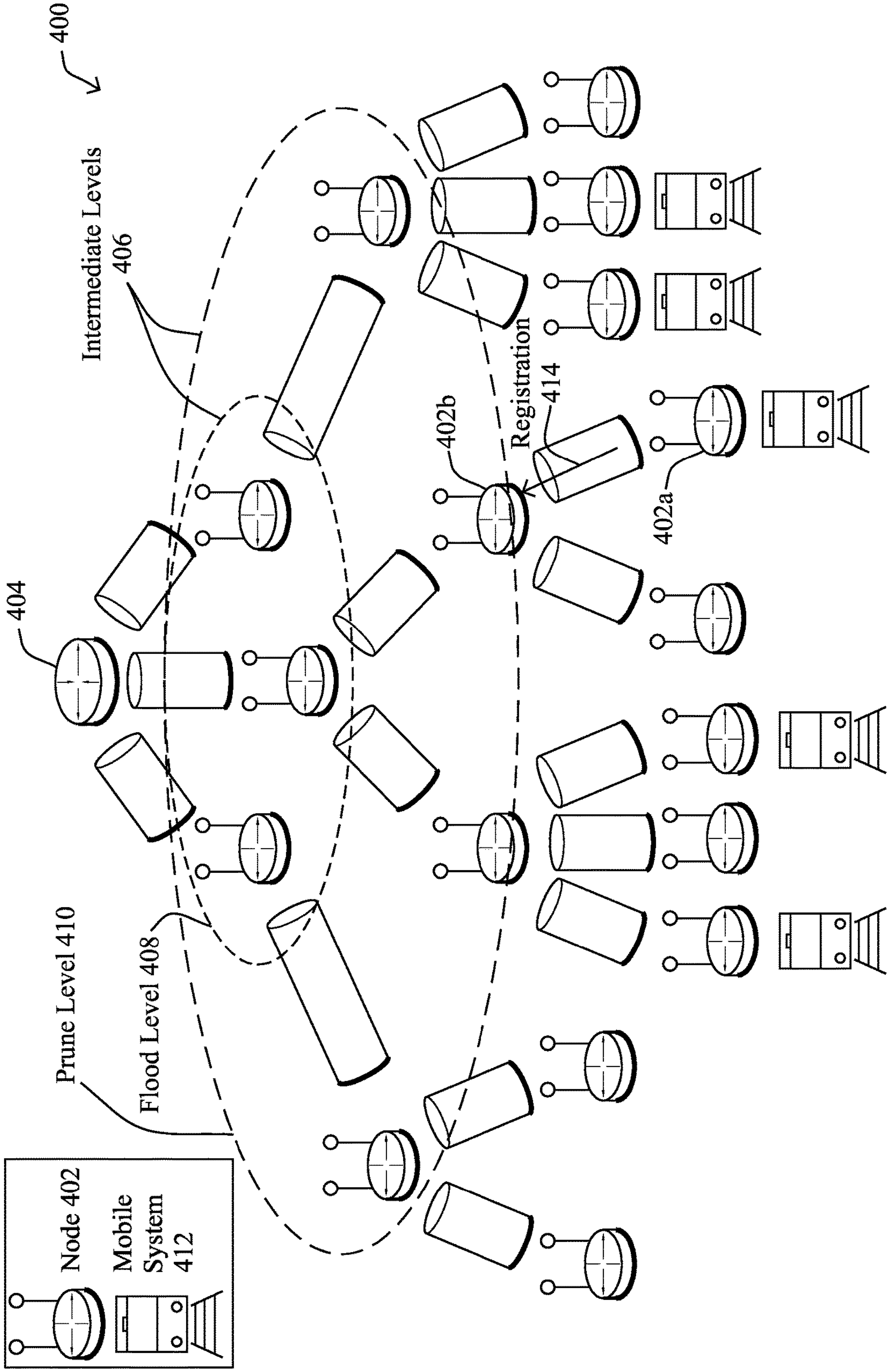
FIGS. 4A-4D illustrate examples of multicasting a packet in a backhaul mesh of a wireless network for delivery to a mobile system.

Operationally, FIGS. 4A-4D illustrate examples of multicasting a packet in a backhaul mesh 400 of a wireless network for delivery to a mobile system. As shown in FIG. 4A, backhaul mesh 400 may include any number of nodes 402, such as routers, wireless access points or relays, wireless controllers, or other such networking devices that communicate with one another, to provide wireless connectivity to a plurality of mobile systems 412 over a physical area.

In accordance with the teachings above, backhaul mesh 400 may be organized in a hierarchical manner whereby a gateway 404 serves as a root node and nodes 402 are connected to it either directly or indirectly (i.e., via one or more other nodes 402) through the establishment of tunnels within backhaul mesh 400. Here, certain nodes 402 in backhaul mesh 400 may be intermediate nodes in accordance with the hierarchy, such as those located at intermediate levels 406: a first set of intermediate nodes 402 that form a flood level 408 (i.e., those nodes 402 directly connected to gateway 404) and a second set of intermediate nodes 402 that form a "prune" level 410, as described further below.

In various embodiments, gateway 404 may sequence multicast packets to enable packet replication and elimination (PREOF). This can be done, for instance, using the tunnel encapsulation used for each frame. In addition, upon make before break, the make side may register to the multicast stream before the break side breaks. Here, the roaming mobile system 412 may receive two copies of the multicast packet and eliminate the duplicate, as each frame is sequenced.

By way of example, FIG. 4A shows a particular node 402*a* (e.g., a wireless access point) from among nodes 402 sending a registration 414 towards an intermediate node 402*b* in prune level 410. In general, these registrations from the leaves of backhaul mesh 400 may be forwarded against the multicast stream sent downward by gateway 404, to create a state at an intermediate level (e.g., prune level 410) that is relatively low in the hierarchy of backhaul mesh 400 near the leaf level (i.e., the access points), so that registrations get there before the "break."

Figure 4B:
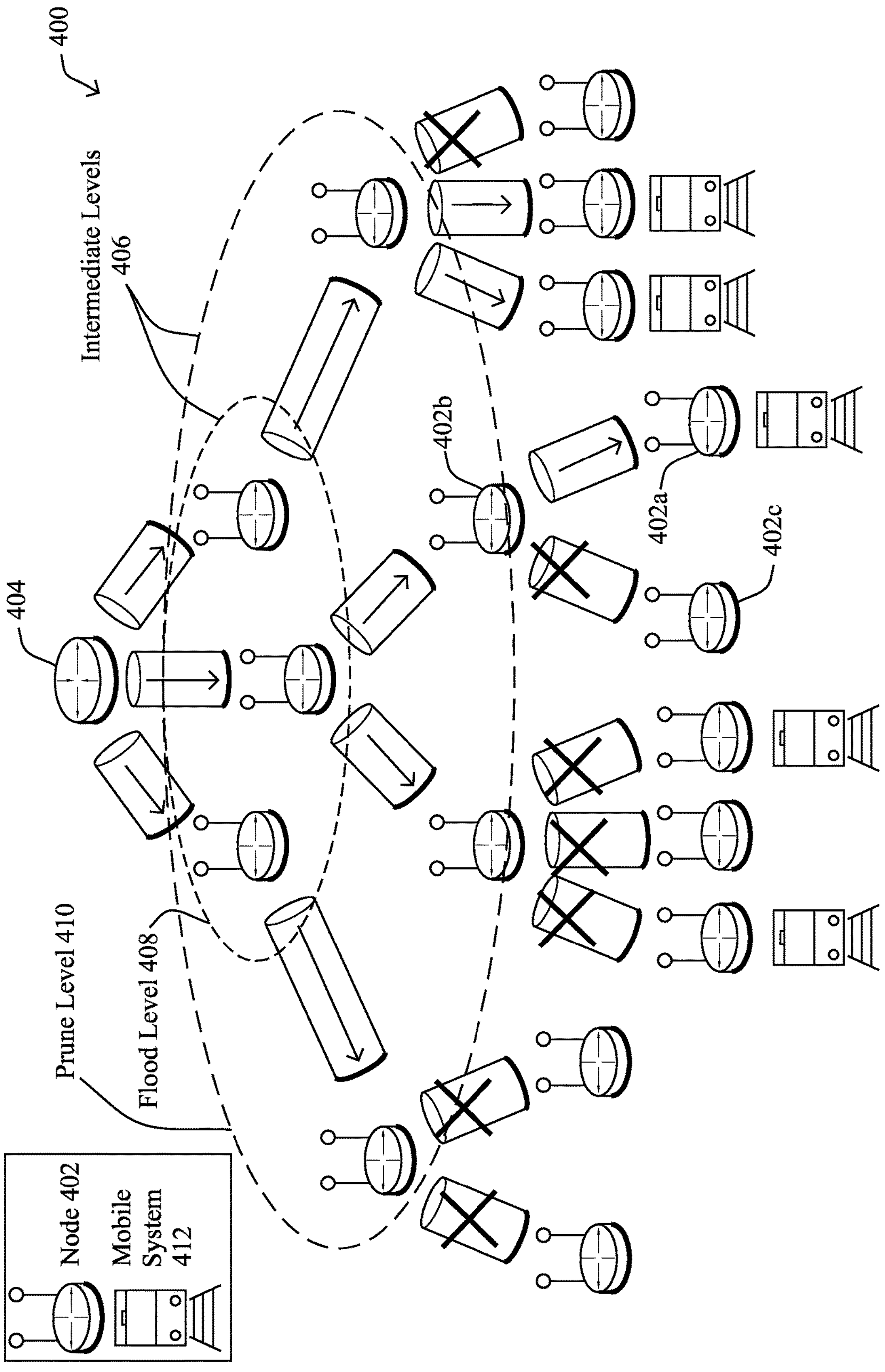
Figure 4C:
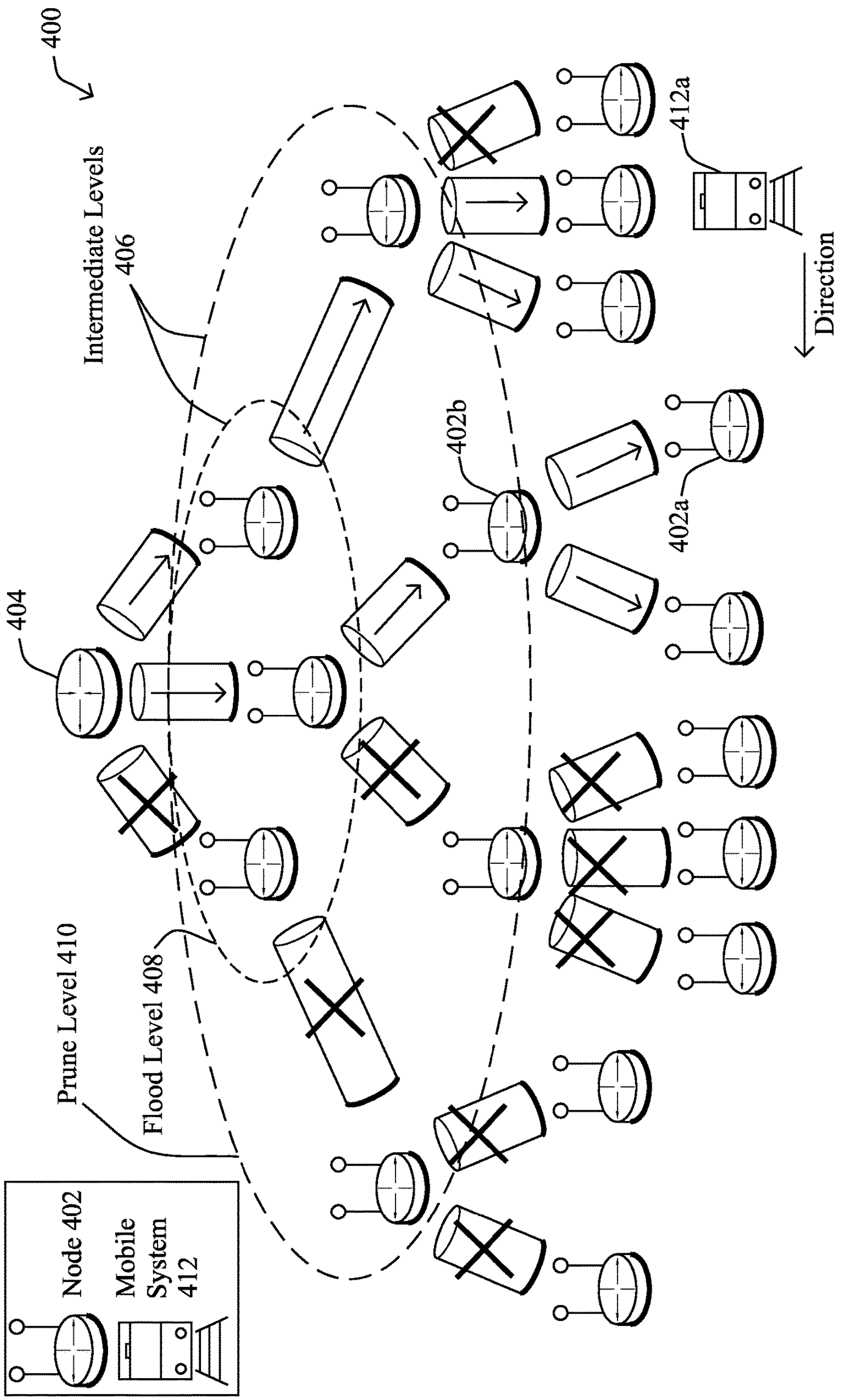

As shown in FIG. 4B, by default, gateway 404 may flood the multicast packets to its next hops in backhaul mesh 400, such as those nodes 402 at flood level 408. Then, starting at those intermediate nodes 402 at prune level 410, which are close enough to the leaves to be reactive and deeper in backhaul mesh 400 towards the leaves, each of these intermediate nodes may make a decision as to whether a multicast packet sent by 404 has as corresponding registration from any of its one or more children nodes 402 in backhaul mesh 400.

Thus, continuing the example of FIG. 4B, intermediate node 402*b* may determine that it has an active registration from node 402*a*, but not one from it other child node, node 402*c*. In such a case, intermediate node 402*b* may forward the packet onward to particular node 402*a* for sending to the mobile system(s) 412 in communication with particular node 402*a*. However, it may also prevent (e.g., drop) that packet from being sent to node 402*c*, since it is not registered to receive that packet.

As would be appreciated, the above approach ensures that the new access point to which a mobile system 412 is roaming, receives the multicast packet before the break occurs, but without having to resort to flooding the packet throughout the entirety of backhaul mesh 400.

In various embodiments, one potential optimization to the above approach entails enabling the mesh nodes of mobile systems 412 to become rendezvous points for the multicast traffic. This could be useful when there are multiple clients of the same multicast traffic within a given mobile system 412. In such a case, the mobile node (e.g., either or both of mobile nodes 310*a*-312*b* in FIG. 3) may be responsible for concentrating the traffic before sending it onward to the destination clients. Doing so means that only a single multicast registration is needed for the entire mobile system 412 with backhaul mesh 400, as the mobile node can handle the replication, locally.

In yet another embodiment, backhaul mesh 400 may leverage a predictive scheme that predicts the movements of mobile systems 412. In such a case, gateway 404 and the nodes 402 at flood level 408 may limit their flooding of a multicast packet, based on the predicted movements of a given mobile system 412. For instance, if a given mobile system 412*a* is moving west, gateway 404 and all nodes 402 at flood level 408 flood multicast traffic to all nodes that carry traffic tunnels to provide backhaul connectivity to the fixed/trackside nodes west of mobile system 412*a*. This is because:

1. The movement of mobile system 412*a* is predictable.
2. In cases such as trains, it is steady in one direction for a long time.
3. The information about handover can be brought up to gateway 404 and observed by the flood-level nodes 402.
4. Flooding does not need precision and can be performed on N next-predictable nodes 402 (such as to cover uncertainties from the prediction).

Thus, the multicast registration for multiple nodes can be followed by mobile system 412*a* and reduce the impact of the flooding.

In yet another potential optimization, when backhaul mesh 400 carries wireless access traffic (e.g., encapsulated as CAPWAP for Cisco deployments), wireless-client multicast traffic is encapsulated in a multicast (CAPWAP) tunnel that allows the above techniques to create intermediate/rendezvous points at the optimal position.

An additional optimization is also possible. For instance, consider the case where mobile system 412*a* (e.g. a train) is roaming across multiple positions (stations) where passengers hop onboard or get off the vehicle. In such a case, in order to maintain a seamless experience for passengers' traffic, it would be beneficial to "pre-enable" multicast registration for client traffic on the passenger-serving access points at the next station that mobile system 412*a* is going to reach. This would ensure the client getting off the vehicle would not experience losses. This is feasible by having the following steps where the underlay of backhaul mesh 400 and wireless LAN controller (WLC) overlay interact:

1. Backhaul mesh 400 (e.g., gateway 404 or another controller/orchestrator) notifies the WLC about next station the vehicle will reach.
2. The WLC will inform the APs located at the station to register for multicast traffic in advance and WLC floods multicast to these APs.
3. Once vehicle has left the station, backhaul mesh 400 informs the WLC to re-evaluate multicast registrations at stations access points.

This could be extended outside of the multicast realm, in order to support dynamic opportunistic key caching (OKC) across the vehicle's access points and fixed access pints at the stations.

Figure 4D:
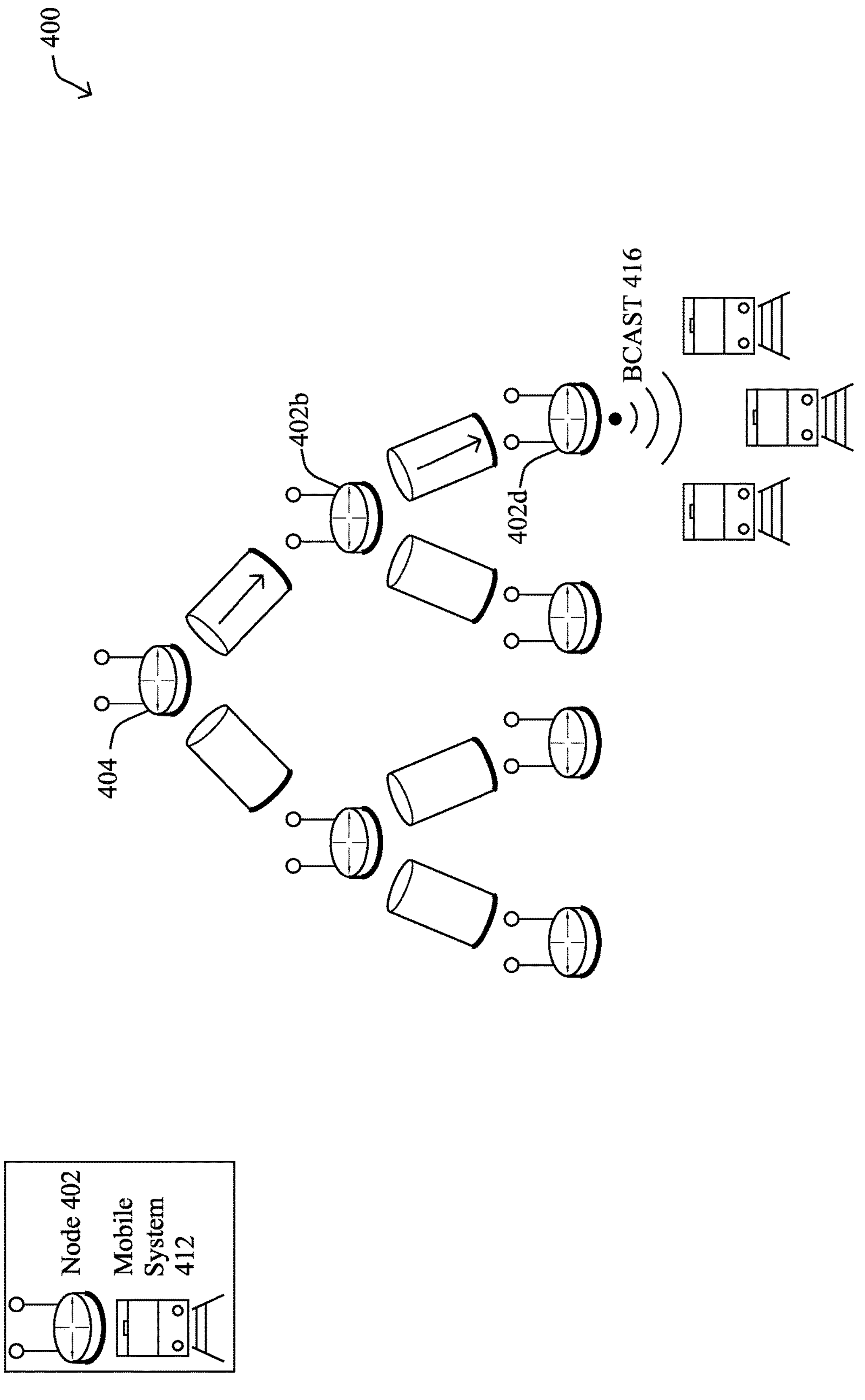

In some embodiments, another potential optimization can be implemented when there are multiple mobile systems 412 that are to receive the same multicast traffic from the same access point. For instance, as shown in FIG. 4D, assume that multiple mobile systems 412 are to receive the same multicast packet from node 402*d*. In such a case, node 402*d* may send the packet as a broadcast 416. This requires special tunnel labels in the MPLS implementation of backhaul mesh 400, or different tags to generalize it to different tunnel technologies.

In another extension to the above techniques, the responsibilities for the mobile node within the mobile system 412 can also include unicast flow deduplication. More specifically, if some content is accessed by multiple different clients on the vehicle/mobile system, hence requiring the same traffic to be replicated N times, the mobile node, once it identifies the situation, can act as a proxy and request the content only once and distribute internally. This depends on the application types: for instance, the mobile node can implement an HTTP cache for frequently accessed web contents.

Figure 5A:
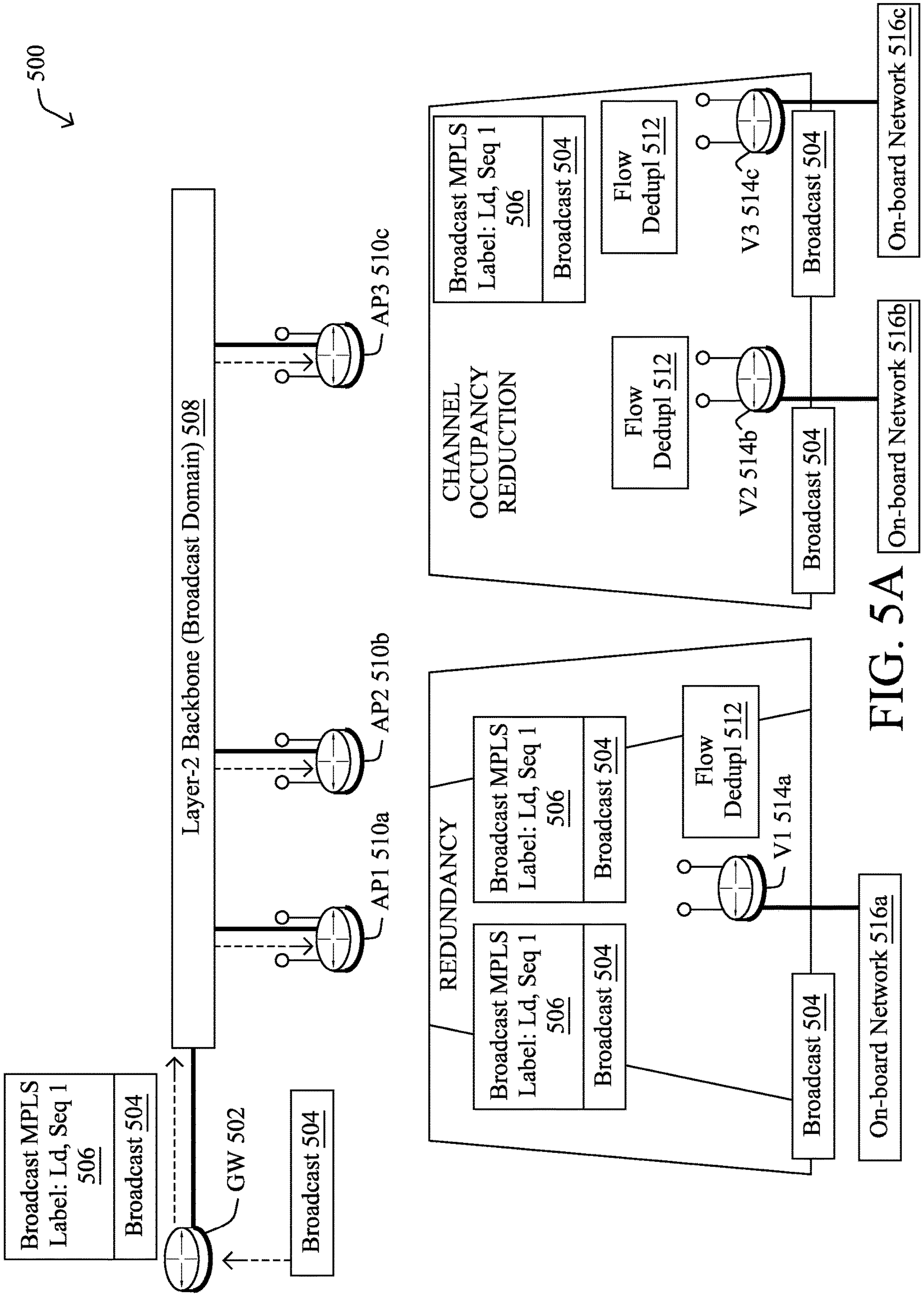
FIGS. 5A-5B illustrate examples of optimizing the sending of a packet to mobile systems.
Figure 5B:
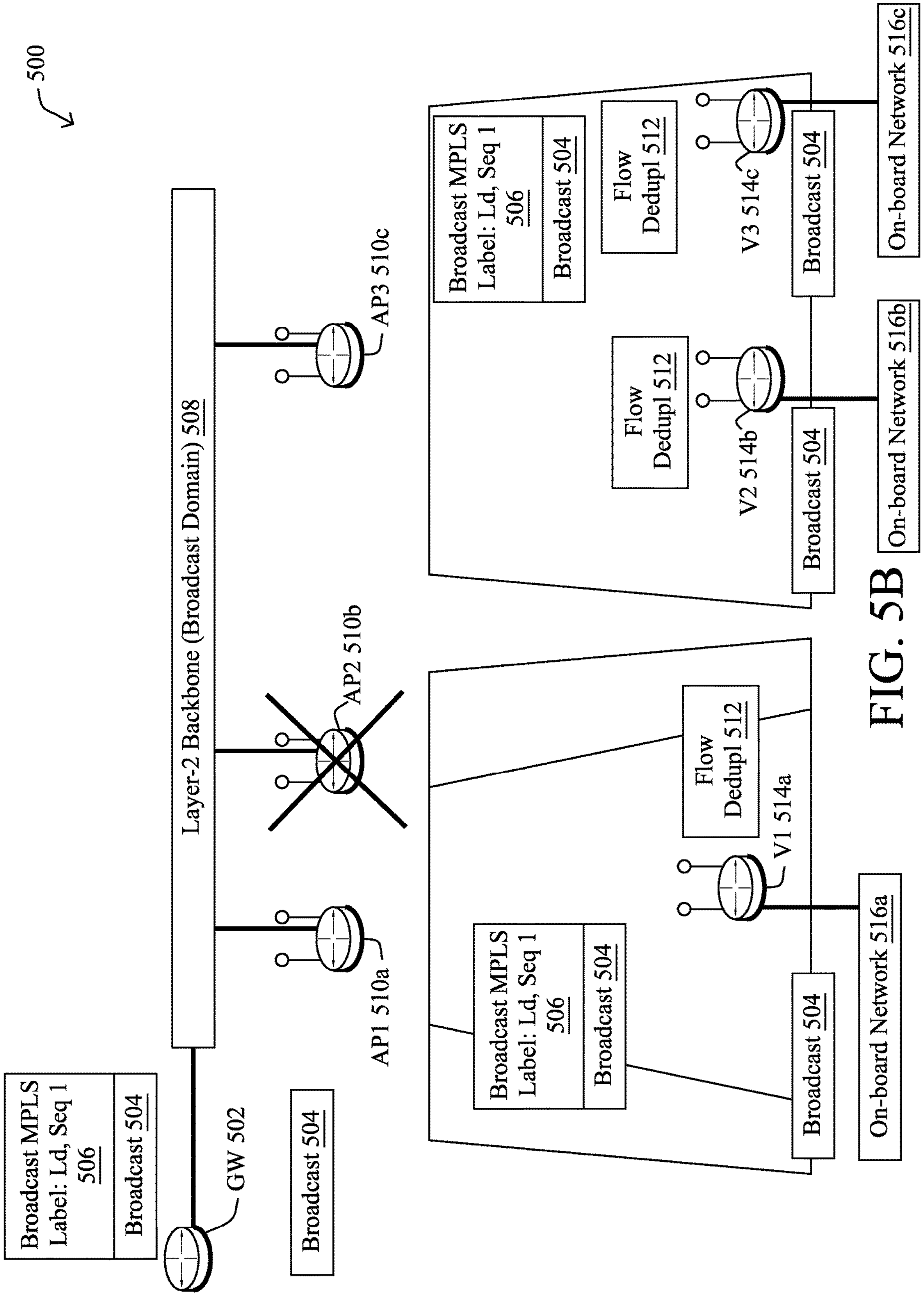

FIGS. 5A-5B illustrate examples of optimizing the sending of a packet to mobile systems, in further embodiments. As shown in FIG. 5A, assume that the backhaul mesh 500 includes a gateway 502 (GW), a Layer-2 backbone 508 that serves as a broadcast domain, and various access points, such as access points 510*a*-5102*c* (denoted AP1-AP3). These access points provide wireless connectivity to various mobile systems/vehicles having mobile nodes 514*a*-514*c* (denoted V1-V3) that serve onboard networks 516*a*-516*c*, accordingly.

In the CURWB MPLS mobility solution, broadcast packets 504 are currently handled via unicast replication at ingress LSR (e.g., at gateway 502), meaning that each packet is transmitted up to N times using unicast MPLS packets 506 over the wireless channel(s) (N=number of vehicles). This potentially consumes significant channel capacity in dense deployments, especially for downlink traffic. In order to reduce the resulting channel occupancy, only a single broadcast MPLS packet may be sent per infrastructure unit, instead of N over the wireless channel.

For instance, mobile nodes 514*b*-514*c* are both located within the wireless coverage range of access point 510*c*. Therefore, a single broadcast packet transmitted by access point 510*c* will be received simultaneously by mobile nodes 514*b*-514*c*. Since MPLS label switching does not natively support broadcast LSPs, a specially-built MPLS tunnels must be created. A "downlink broadcast MPLS tunnel" uses a single label Ld across the whole system to forward packets from the ingress LSR (gateway 502) to egress LSR (the mobile master unit located on each mobile system/vehicle). The MPLS data plane tables for this special tunnel are purposely filled in by an ad-hoc label assignment algorithm, rather than relying on the standard label distribution protocol. Since each mobile node 514 may receive multiple copies of the same packet wirelessly, a flow deduplication operation 512 may be used at the egress of the broadcast LSP on the onboard LSRs. For this purpose, a flow sequence number may be included in the MPLS shim header.

This technique naturally provides redundancy protection. Here, the mobile system/vehicle having mobile node 514*a* is located in an area where the wireless coverage of access points 510*a*-510*b* overlap, and will be able to receive a copy from both of them. Should the packet copy transmitted by access point 510*a* be lost for any reason, the other from access point 510*b* could be still received.

As shown in FIG. 5B, as a further optimization for the redundancy use case whereby the density of access points 510 allows for redundant wireless coverage for each mobile system/vehicle and a given mobile node 514 can simultaneously receive packets from multiple access points 510. In such a case, only a subset of access points 510 may be designated at any given time, to forward the broadcast packets 506 wireless. For instance, in this case, access point 510*b* may be disabled.

Figure 6:
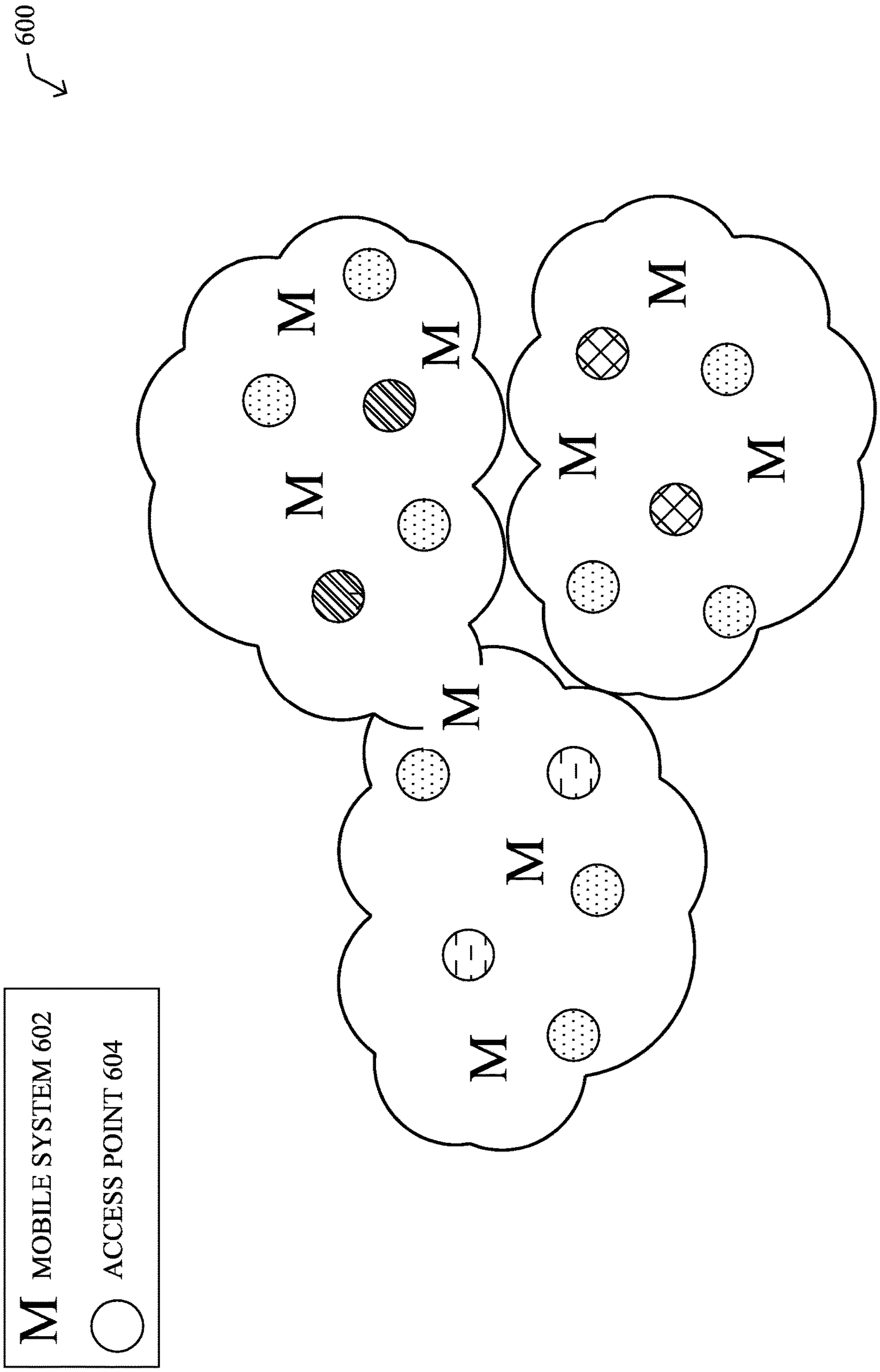
FIG. 6 illustrates an example of optimizing the sending of packets to a high density of mobile systems.

In large high-density deployments, such as the example 600 in FIG. 6, assume that there is a large density of both mobile systems 602 and access points 604. Here, the set of access points 604 that are "enabled" to forward broadcast MPLS packets could be determined as a function of the coverage heatmaps of the mobile systems 602 as they move around the area. The set could be static or dynamic, e.g., determined during the commissioning phase for the system in the former case, or updated during the operation of the system depending on the number and the location of backlogged access points 604.

Figure 7:
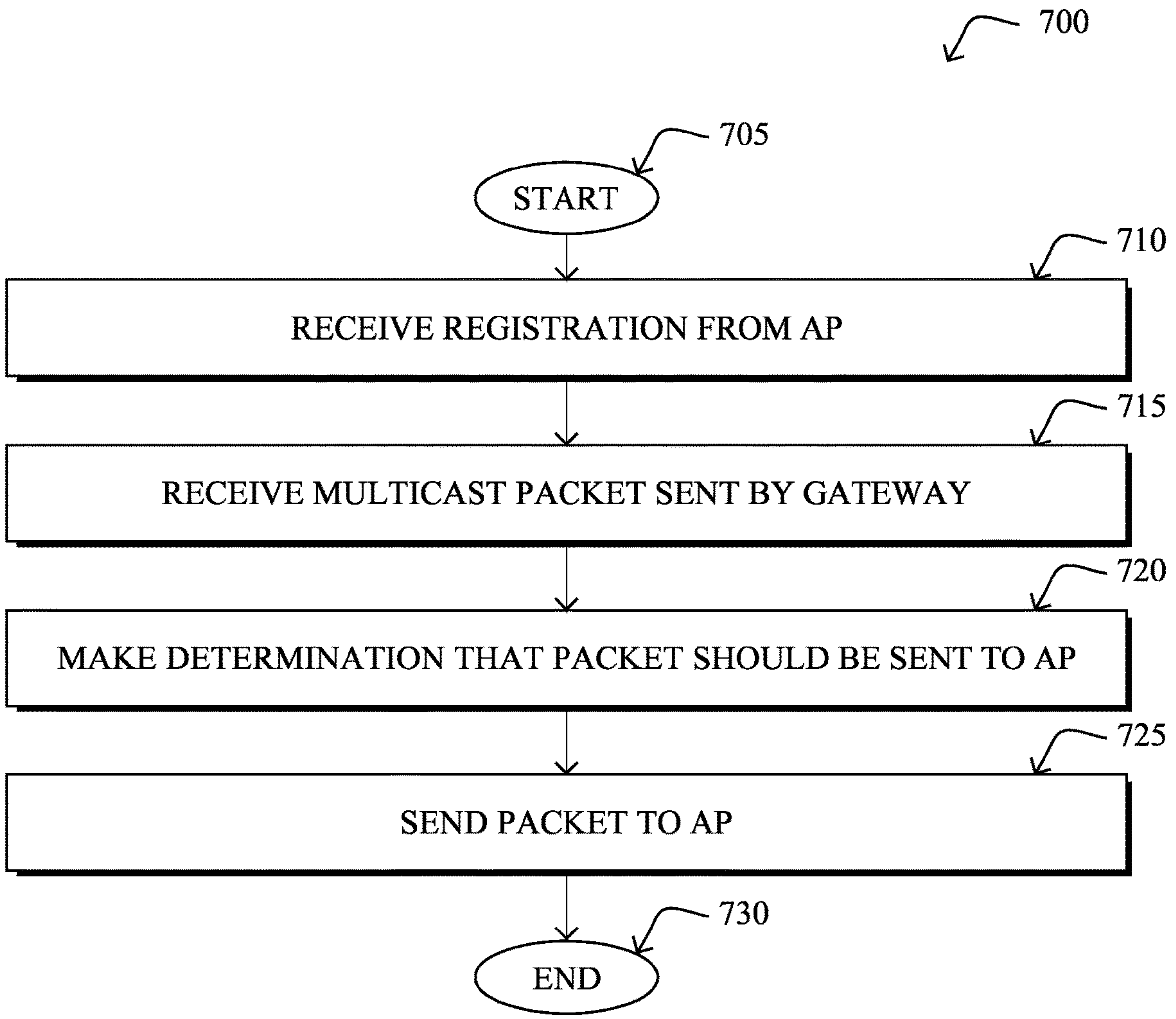
FIG. 7 illustrates an example simplified procedure for optimizing a multi-cast flow in a backhaul mesh for a wireless network.

FIG. 7 illustrates an example simplified procedure (e.g., a method) for reducing power consumption in mesh networks, in accordance with one or more embodiments described herein. For example, a non-generic, specifically configured device/apparatus (e.g., device 200), such as an intermediate device in a backhaul mesh of a wireless network, may perform procedure 700 by executing stored instructions (e.g., communication process 248 and/or routing process 244). Procedure 700 may start at step 705 and continues on to step 710 where, as described in greater detail above, the intermediate device may receive a registration from an access point of the wireless network in communication with a mobile system. In one embodiment, the intermediate device is a network router. In some embodiments, the mobile system travels along a fixed path (e.g., a railway, a roadway, a waterway, etc.). In various embodiments, the a mobile system comprises a vehicle or autonomous robot.

At step 715, as detailed above, the intermediate device may receive a packet that is multicast by a gateway into the backhaul mesh and destined for the mobile system. In various embodiments, the gateway floods the packet into backhaul mesh based on a predicted location of the mobile system.

At step 720, the intermediate device may make a determination that the packet should be sent to the access point, as described in greater detail above. In some embodiments, the intermediate device may also drop a particular packet sent by the gateway based on a determination that the intermediate device does not have a registration associated with a destination of the particular packet.

At step 725, as detailed above, the intermediate device may send the packet to the access point for transmittal to the mobile system. In some embodiments, a node of the mobile system serves as a single multicast destination for multiple nodes onboard the mobile system to which it sends the packet upon receipt from the access point. In one embodiment, the intermediate device sends the packet to the access point via a tunnel in the backhaul mesh. In further embodiments, the access point broadcasts the packet to the mobile system and to one or more other mobile systems. In one embodiment, the access point broadcasts the packet to the mobile system and to the one or more other mobile systems as a singular wireless packet.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for multicast flow optimizations in a multi-level backhaul mesh of a wireless network, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

receiving, at an intermediate device in a multi-level backhaul mesh for a wireless network, a registration from an access point of the wireless network in communication with a mobile system, wherein the intermediate device and the access point are already part of a multicast tree for the multi-level backhaul mesh, wherein the multi-level backhaul mesh comprises a gateway, a flood level of nodes connected to the gateway, and a prune level of nodes between the flood level and the access point, wherein the intermediate device is located at the prune level, and wherein the registration establishes a local multicast state at the intermediate device associating the access point with a multicast destination corresponding to the mobile system;

receiving, at the intermediate device, a packet that is multicast by the gateway into the multi-level backhaul mesh and destined for the mobile system on the multicast tree, wherein the gateway floods the packet to the flood level and the packet is forwarded from the flood level to the intermediate device at the prune level;

making, by the intermediate device and based on the registration, a local determination whether the packet should be sent on the multicast tree according to the local multicast state, wherein the local determination is made at the prune level without requiring state information from the gateway; and sending, by the intermediate device, the packet on the multicast tree to the access point for transmittal to the mobile system only in response to the local multicast state having received the registration from the access point.

2. The method as in claim 1, wherein the intermediate device is a network router.

3. The method as in claim 1, wherein a node of the mobile system serves as a single multicast destination for multiple nodes onboard the mobile system to which it sends the packet upon receipt from the access point.

4. The method as in claim 1, wherein the intermediate device sends the packet to the access point via a tunnel in the multi-level backhaul mesh.

5. The method as in claim 1, further comprising:

dropping, by the intermediate device, a particular packet sent by the gateway based on a determination that the intermediate device does not have a registration associated with a destination of the particular packet.

6. The method as in claim 1, wherein the gateway floods the packet into the multi-level backhaul mesh based on a predicted location of the mobile system.

7. The method as in claim 1, wherein the access point broadcasts the packet to the mobile system and to one or more other mobile systems.

8. The method as in claim 7, wherein access point broadcasts the packet to the mobile system and to the one or more other mobile systems as a singular wireless packet.

9. The method as in claim 1, wherein the mobile system travels along a fixed path.

10. The method as in claim 1, wherein the mobile system comprises a vehicle or autonomous robot.

11. An apparatus, comprising:

one or more network interfaces to communicate in a multi-level backhaul mesh for a wireless network;

a processor coupled to the one or more network interfaces and configured to execute one or more processes; and a memory configured to store a process that is executable by the processor, the process when executed configured to:

receive a registration from an access point of the wireless network in communication with a mobile system, wherein the apparatus and the access point are already part of a multicast tree for the multi-level backhaul mesh, wherein the multi-level backhaul mesh comprises a gateway, a flood level of nodes connected to the gateway, and a prune level of nodes between the flood level and the access point, wherein the apparatus is located at the prune level, and wherein the registration establishes a local multicast state at the apparatus associating the access point with a multicast destination corresponding to the mobile system;

receive a packet that is multicast by the gateway into the multi-level backhaul mesh and destined for the mobile system on the multicast tree, wherein the gateway floods the packet to the flood level and the packet is forwarded from the flood level to the apparatus at the prune level;

make, based on the registration, a local determination whether the packet should be sent on the multicast tree according to the local multicast state, wherein the local determination is made at the prune level without requiring state information from the gateway; and send the packet on the multicast tree to the access point for transmittal to the mobile system only in response to the local multicast state having received the registration from the access point.

12. The apparatus as in claim 11, wherein the apparatus is a network router.

13. The apparatus as in claim 11, wherein a node of the mobile system serves as a single multicast destination for multiple nodes onboard the mobile system to which it sends the packet upon receipt from the access point.

14. The apparatus as in claim 11, wherein the apparatus sends the packet to the access point via a tunnel in the multi-level backhaul mesh.

15. The apparatus as in claim 11, wherein the process when executed is further configured to:

drop a particular packet sent by the gateway based on a determination that the apparatus does not have a registration associated with a destination of the particular packet.

16. The apparatus as in claim 11, wherein the gateway floods the packet into the multi-level backhaul mesh based on a predicted location of the mobile system.

17. The apparatus as in claim 11, wherein the access point broadcasts the packet to the mobile system and to one or more other mobile systems.

18. The apparatus as in claim 17, wherein access point broadcasts the packet to the mobile system and to the one or more other mobile systems as a singular wireless packet.

19. The apparatus as in claim 11, wherein the mobile system travels along a fixed path.

20. A tangible, non-transitory, computer-readable medium storing program instructions that cause an intermediate device in a multi-level backhaul mesh for a wireless network to execute a process comprising:

receiving, at the intermediate device, a registration from an access point of the wireless network in communication with a mobile system, wherein the intermediate device and the access point are already part of a multicast tree for the multi-level backhaul mesh, wherein the multi-level backhaul mesh comprises a gateway, a flood level of nodes connected to the gateway, and a prune level of nodes between the flood level and the access point, wherein the intermediate device is located at the prune level, and wherein the registration establishes a local multicast state at the intermediate device associating the access point with a multicast destination corresponding to the mobile system;

receiving, at the intermediate device, a packet that is multicast by the gateway into the multi-level backhaul mesh and destined for the mobile system on the multicast tree, wherein the gateway floods the packet to the flood level and the packet is forwarded from the flood level to the intermediate device at the prune level;

making, by the intermediate device and based on the registration, a local determination whether the packet should be sent on the multicast tree according to the local multicast state, wherein the local determination is made at the prune level without requiring state information from the gateway; and sending, by the intermediate device, the packet on the multicast tree to the access point for transmittal to the mobile system only in response to the local multicast state having received the registration from the access point.

* * * * *